United States Patent [19]
Grau et al.

[11] 3,924,544
[45] Dec. 9, 1975

[54] APPARATUS FOR LOCKING A CONTAINER ON A BASE MEMBER, PREFERABLY A CARRIAGE

[76] Inventors: Dietrich Grau, Grauenbrunnenweg 23, 6906 Leimen; Franz Beigel, Rosenstr. 6, 6906 Malschenberg; Roland Blanz, Werderstr. 12, 6900 Heidelberg, all of Germany

[22] Filed: Mar. 13, 1974

[21] Appl. No.: 449,587

[30] Foreign Application Priority Data
Mar. 13, 1973  Germany............................ 2312402
Aug. 28, 1973  Germany........................... 2343251

[52] U.S. Cl............... 105/366 B; 24/221; 296/35 A
[51] Int. Cl.²......................................... B61D 17/00
[58] Field of Search... 24/221, 221 K, 221 L, 221.2, 24/230 TC; 105/366 R, 366 B; 248/361 A, 119 R; 296/35 A

[56] References Cited
UNITED STATES PATENTS
3,486,787  12/1969  Campbell.......................... 296/35 A
3,593,387  7/1971  Georgi.......................... 296/35 A X
3,612,466  10/1971  Arnold........................ 105/366 B X
3,768,857  10/1973  Horton........................ 105/366 B X

*Primary Examiner*—Robert S. Ward, Jr.
*Assistant Examiner*—Gene A. Church
*Attorney, Agent, or Firm*—Roland I. Griffin

[57] ABSTRACT

Tension rods are mounted on a base member such as a carriage and are positioned for engagement with corresponding fittings mounted on a container. Each of the tension rods is provided with a locking head, is coupled to a plunger guided within a fluid cylinder, is guided for pivotal movement between release and locking positions, and is spring loaded to the locking position by a compression spring. The tension rods are moved to the release position against the compression springs by the application of fluid pressure to the fluid cylinders. In the release position the locking heads are oriented so that they may be inserted into the fittings of the container. The fluid cylinders are then vented so that the tension rods are pivotally moved to the locking position by the compression springs thereby fixedly engaging the locking heads with the fittings of the container to hold the container in place on the base member.

16 Claims, 14 Drawing Figures

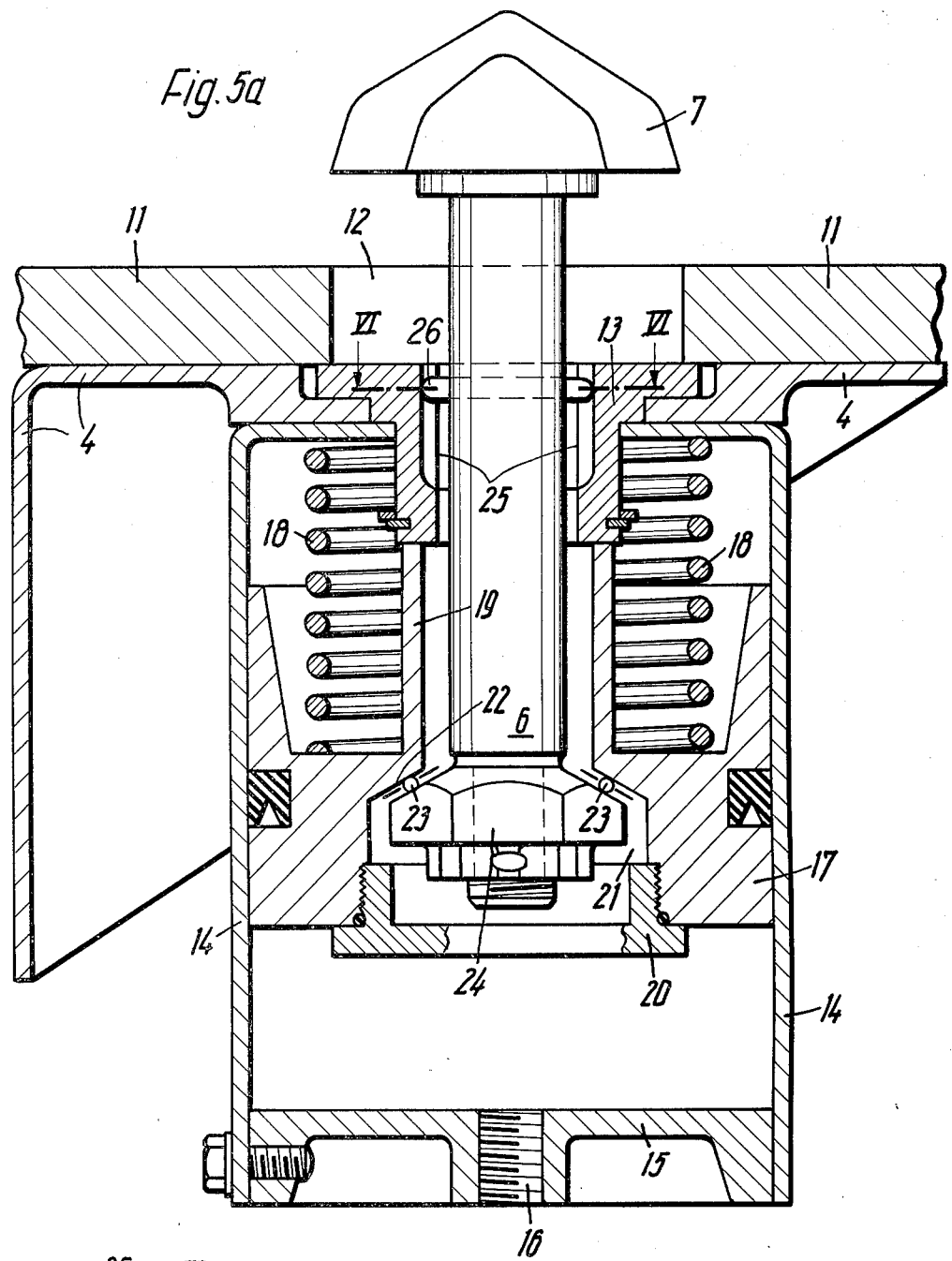
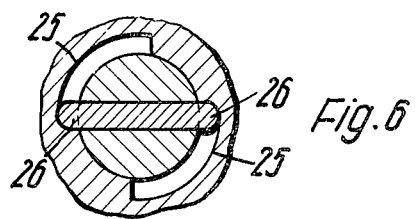

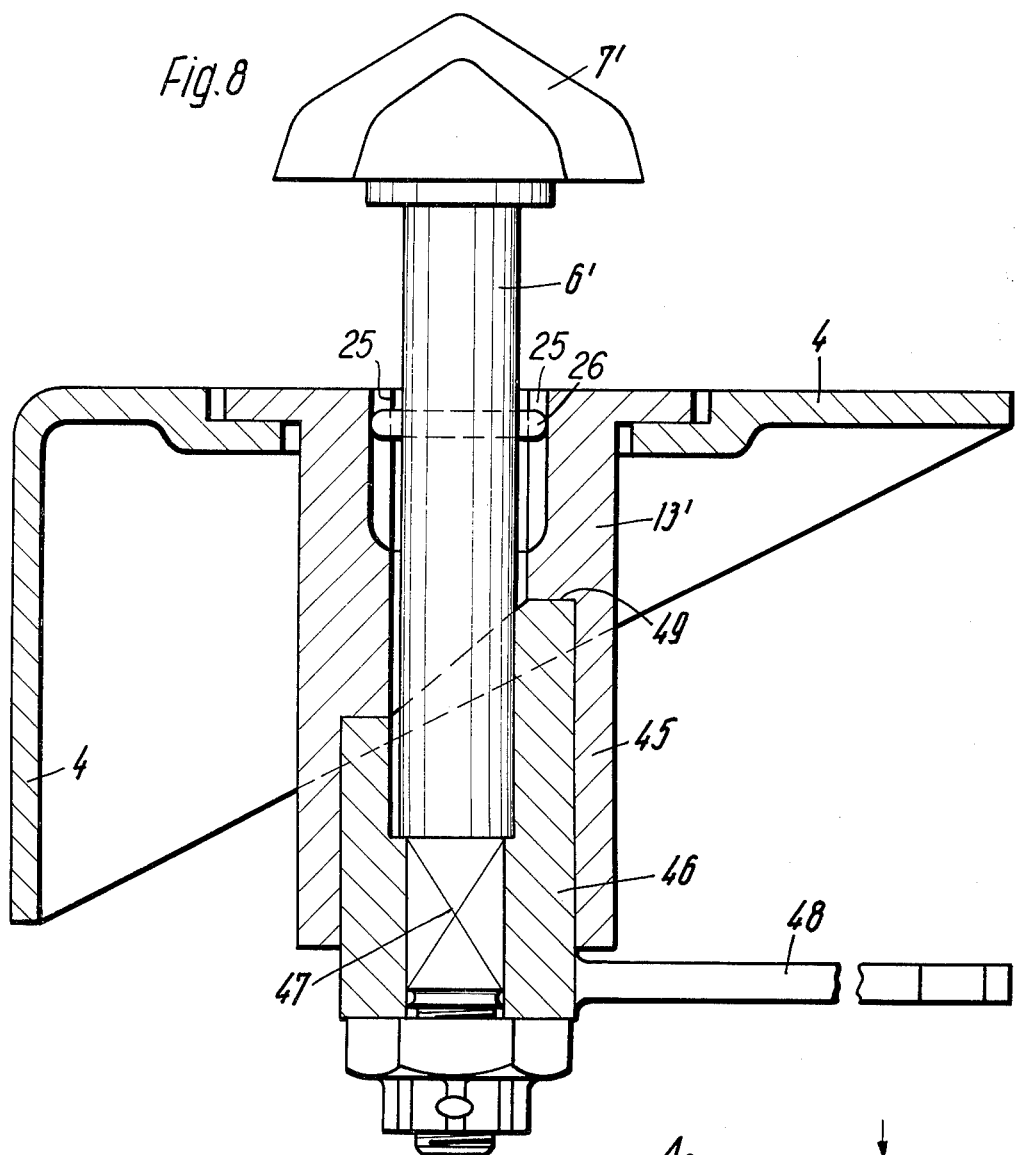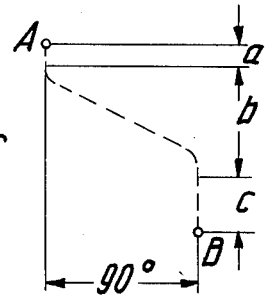

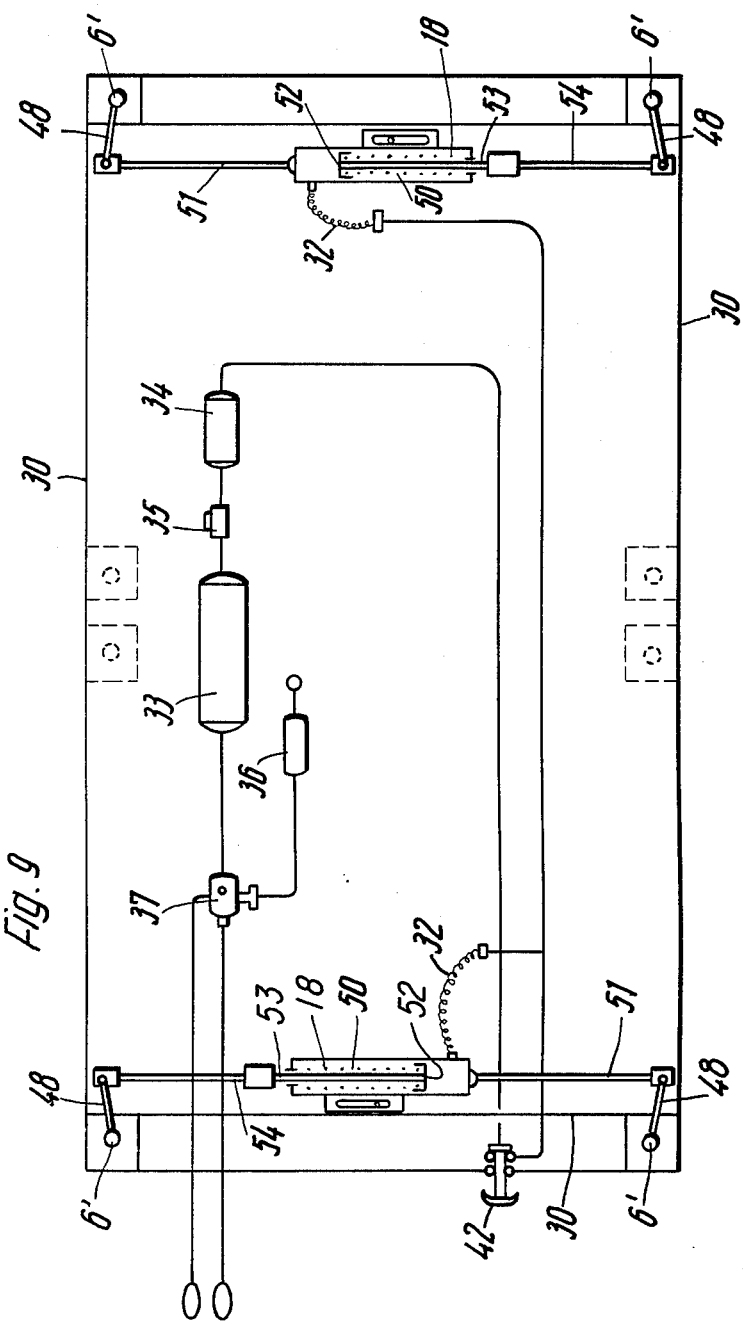

APPARATUS FOR LOCKING A CONTAINER ON A BASE MEMBER, PREFERABLY A CARRIAGE

BACKGROUND OF THE INVENTION

This invention is related to an apparatus for locking a container on a base member, preferably a carriage, including spring-loaded tension rods which by force and by form engage fittings provided on the container. Each tension rod includes a locking head and can be lifted and pivoted from a locking position to a release position pivotally as determined by a guide.

Structures, such as containers, should be sufficiently secured on their respective transporting vehicles as to avoid a sliding movement or a weakening of the initial container holding or stressing force. This is true for ships as well as for planes and for land vehicles, such as trucks and trailers and other movable carriages.

The well-known container fixtures for use in holding a container on the carriage of a transport vehicle have holes or recesses, into which tension rods can be inserted at the carriage. The tension rods are constructed like screw spindles such that their T-shaped locking heads can be brought into fixed abutment with the respective container fixtures in order to secure the whole container on the carriage. Especially in the case of the road transport vehicles it is necessary to avoid the creation of noise by applying an initial container holding or stressing force. However, there is still a danger that the initial stressing force will be lost because of displacements of the container such that the container will only be held by form locking and will therefore have a tendency to cause noise during transportation.

A further shortcoming of the known container securing mechanisms is that considerable time and manual effort are required in order to tighten or loosen the tension rods. Furthermore, there are provided additional safety devices which should be used to prevent an unwanted detachment of the tension rods. These shortcomings and additional required safety devices tend to increase the loading or rest times of the transport vehicles.

SUMMARY OF THE INVENTION

It is the major object of the present invention to avoid the shortcomings of the prior art and to provide an apparatus of the initially described kind by which a positive coupling between the container and the base member is obtained such that the creation of noise during transportation on roads is decreased.

Another object of the present invention is to provide an apparatus as in the preceding object that is able to retension the positive coupling at any time. Still another object of the present invention is to provide a form coupling such that the container together with the base member can be loaded on suitable vehicles, especially for rail traffic, while the container and the base member are positively coupled.

A further object of the present invention is to provide an apparatus as in any of the preceding objects that may be quickly and easily handled so that vehicles can be quickly loaded and unloaded.

These objects are achieved with an apparatus of the initially described kind by the provision of locking devices each having a drive for lifting and pivoting a tension rod and its locking head into the release position. This drive mechanism comprises a curved groove guide and a fluid pressurized plunger which is guided in a working cylinder. The working cylinder communicates with a source of fluid pressure via a control device. A compression spring is provided for the automatic self-locking and continuous retensioning of the tension rod. In connection with the groove guide there is only provided a single plunger with its working cylinder whereby the lifting as well as the pivoting movements of the tension rod are effected. When the fluid pressure is released, the compression spring acts as a drive force such that automatic locking of the container takes place on the base member. In case the container should be displaced on the base member during transport because of shocks or in case the mounting of the container on the base member should change, the compression spring will make sure that the container is positively pressed against the base member. Thus, the noise that would otherwise be created by the container hitting the carriage is avoided. The mounting of the container on the base member by means of the compression spring has the further advantage that the container will also be locked on the base member when the source of fluid pressure fails.

Furthermore, it is important that the working cylinder together with the plunger and the tension rod form an upright unitary structure on the base member whereby the tension rod is pivotally mounted with axial clearance in the plunger. The pivotal mounting of the tension rod in the plunger is necessary in order to allow the lifting and pivoting movements of the tension rod without simultaneously turning the plunger. The plunger is spring located by a relatively strong compression spring, so that it can not be pivoted. The axial clearance of the tension rod in the plunger allows in all conditions good abutment of a locking head of the tension rod with a corresponding fitting of the container.

According to a preferred embodiment of the present invention, a part of the tension rod is hollow and the groove guide comprises a stationary guide rod mounted therein and provided with guiding surfaces. These surfaces allow at least a lifting movement and a dural lifting and pivoting movement of the tension rod relative to the guide rod. The tension rod has a collar which corresponds to the guide rod, and the guide rod has a cross section which is suitably shaped to provide the collar and, hence, the tension rod with the lifting and pivoting movements. Thus, a very compact structure is obtained which takes into account the limited space available.

In the unpressurized condition the lifting and pivoting movement of the tension rod is impeded by a locking structure. The positive coupling is obtained by the spring-loaded plunger or tension rod. The form-coupling is assured by the locking structure, and the point of engagement of the locking structure is matched to the special conditions of the application. The use of a fluid pressurized plunger allows an easy handling of one locking device or of several locking devices which are jointly located on a base member.

The locking structure includes a fluid pressurized operating piston. When pressurized air is supplied to the plunger and the operating piston, the effect of the locking structure is compensated. Conversely, if the plunger and the operating piston are released from the pressurized air, the locking structure becomes effective so that in addition to a positive coupling a form-coupling is provided, where the form-coupling limits the path of the positive coupling. The locking structure is preferably a ball notch.

A very compact locking device is obtained when the shank of the tension rod forms a cylindric guide for the operating piston, which is guided therein in a sealed fashion, and when the pressurized fluid of the plunger is applied to one side of the operating piston while the other side of the operating piston is biased by a retracting spring supported in the tension rod. The cylindric guide is formed with a cage for notch balls. In the lifting area of the notch balls a spacing sleeve surrounds the tension rod in order to control the radial movement of the notch balls. On the one hand the spacing sleeve serves to limit the radial movement of the notch balls, and on the other hand the spacing sleeve forms an abutment for the form coupling between the tension rod and the housing of the apparatus.

The operating piston has a shank having a superficies with a different diameter over its length. Thus, the balls of the ball notch are allowed to take a radial position where they are located only in the region of the operating piston and the cylindric guide. The components are shaped so that this condition occurs in one end position of the operating piston, while in the other end position of the operating piston the notch balls extend more or less outward of the cylindric guide into the area of the spacing sleeve. The spacing sleeve has an inner surface facing the notch balls, which surface has a varying diameter along its length. There are provided two areas, and the form coupling is obtained at the transition between both areas by means of the ball notch. The operating piston is located in the tension rod in a movable manner with limited clearance. For this purpose, there are several possibilities. According to a very simple embodiment, with a failure of the pressurized fluid the operating piston will be supported by a guide rod which is located within the housing of the locking device in a concentric fashion relative to the tension rod.

Furthermore, it is of importance that the guide rod traverses the cover of the housing in a sealing manner and that the guide rod is mounted in a pivotal and arrestable fashion. The sealing mounting is necessary as the pressure volume of the plunger would not otherwise be sealed. The pivotal mounting of the guide rod is necessary for a manual lifting of the tension rod. Concomitantly, the guide rod should be arrestable, (i.e., it should be possible to secure it against rotation) so that the desired pivoting and lifting movements of the tension rod are enabled. For this purpose the tension rod has a collar which fits the guide rod, while the guide rod has a cross section which provides the collar and, hence, the tension rod with the desired pivoting and lifting movements. The guide rod can consist of a square or hexagonal profile. It is only of importance that the profile of the guide rod and of the collar are matched and that they contain such undercuts that an axial force allows a pivoting and lifting of the tension rod. Of course, the pivot angle is limited to 90°.

It is rather advantageous to provide the lower end of the guide rod with a radially protruding lever which traverses the cover of the housing and to connect this lever rigidly with the guide rod. At the cover of the housing a detachable bearing for the fixation of the lever should be provided. In the rest-position the lever is locked in the detachable bearing, so that the guide rod is secured against rotation. In case the pressurized air fails and the coupling between the container and the base member should be disconnected, the detachable bearing will be detached and the lever will be pivoted by about 90° so that the tension rod will also be pivoted by about 90° and its locking head will be released from abutment on the corresponding fitting of the container. Thus, the container can be lifted from the base member. When the locking device is to be used again, the lever will be locked again in the detachable bearing. The tension rod is sealingly and pivotally mounted in the plunger so that upon a manual rotation of the guide rod only the tension rod but not the plunger will be rotated.

There are several possible embodiments of the various components of the locking devices of this invention. With a horizontal arrangement of the operating cylinder and the plunger, the plunger will engage the tension rod via a pivot arm. However, it is also possible to mount the horizontal operating cylinder in a floating manner between two opposite tension rods having pivotal arms operable in opposite directions.

BRIEF DESCRIPTION OF THE DRAWINGS

Preferred embodiments of the invention are illustrated by way of the drawings in which:

FIG. 5a is a cross sectional view on an extended scale of one embodiment of a locking device including a tension rod and an operating cylinder in a release position;

FIG. 5c is a detail view related to the curved groove guides of the locking device of FIGS. 5a and 5b;

FIG. 6 is a sectional view taken along the lines VI—VI of FIG. 5a;

FIG. 8 is a sectional view of another embodiment of a locking device for a floating spring-loaded cylinder;

FIG. 9 is a schematic view of a fluid pressure system that can be used with the locking device of FIG. 8;

DESCRIPTION OF THE PREFERRED EMBODIMENTS

Figure 1:
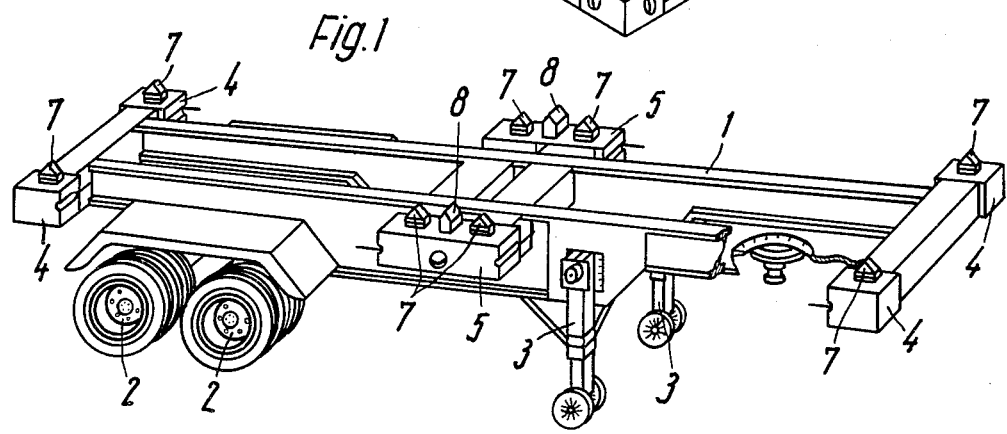
FIG. 1 is a perspective view of a carriage for the transport of a container.

According to FIG. 1 there is provided a carriage 1 which has only one set of wheels 2. Pivotal supports 3 at the front end of the carriage allow an arresting of the carriage. At the corners and also at the middle of the carriage there are provided bearings 4 and 5 in which axially displacable tension rods 6 of locking devices (see FIGS. 5a and 5b) are guided in a manner to be described later. In FIG. 1 only the locking heads 7 of the tension rods are illustrated. Each of the bearings 5 has two tension rods with locking heads between which a centering wedge 8 is provided for a container. On the carriage 1 one extremely long container or two containers of a smaller length can be transported.

Figure 2:
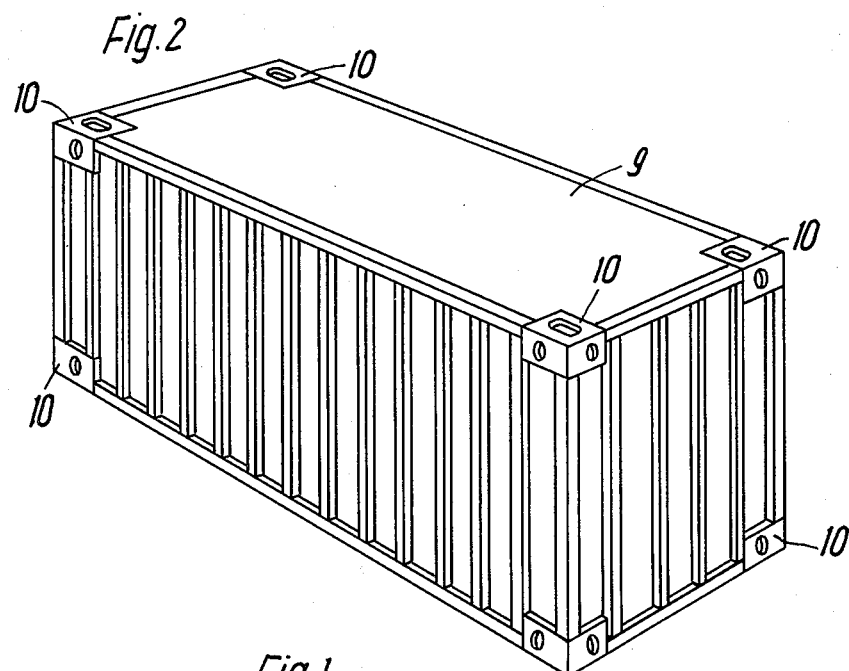
FIG. 2 is a perspective view of a container.

The carriage and the tension rod arrangements match the standardized dimensions of the container 9 shown in FIG. 2. Each such container 9 is of a self-supporting construction and has fittings 10 at its ends or at its sides for locking the container on a respective carriage or base member or for engaging a hook of the lifting appliance. There are several possible embodiments of the fittings 10, only one of which is described herein.

Figure 3:
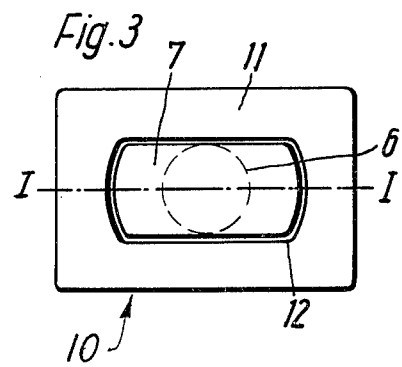
FIG. 3 is a top view of a container fitting.
Figure 4:
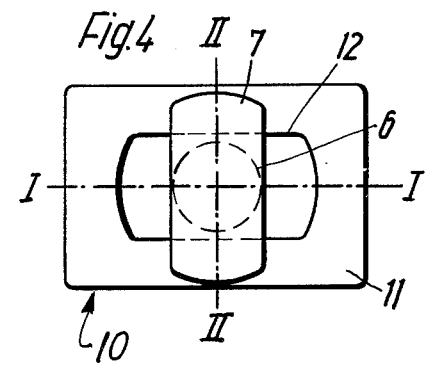
FIG. 4 is a top view of the same container fitting as in FIG. 3, but after a tension rod has been inserted therein and pivoted.

As shown in FIGS. 2–4, each fitting 10 basically comprises a plate 11 with a slot 12 having an inner width such that the tension rod 6 of a corresponding locking device can be passed therethrough with its laterally flared locking head 7. When the container 9 is lowered, each locking head 7 of the carriage 1 is positioned in the axial direction I—I with regard to the corresponding plate 11 as shown in FIG. 3. However, in the coupled condition each tension rod 6 and, hence, each locking head 7 of the carriage 1 is pivoted by 90° relative to the axis I—I so that each locking head takes the position II—II shown in FIG. 4 and thereby engages the upper side of the plate 11 upon tensioning.

Figure 5B:
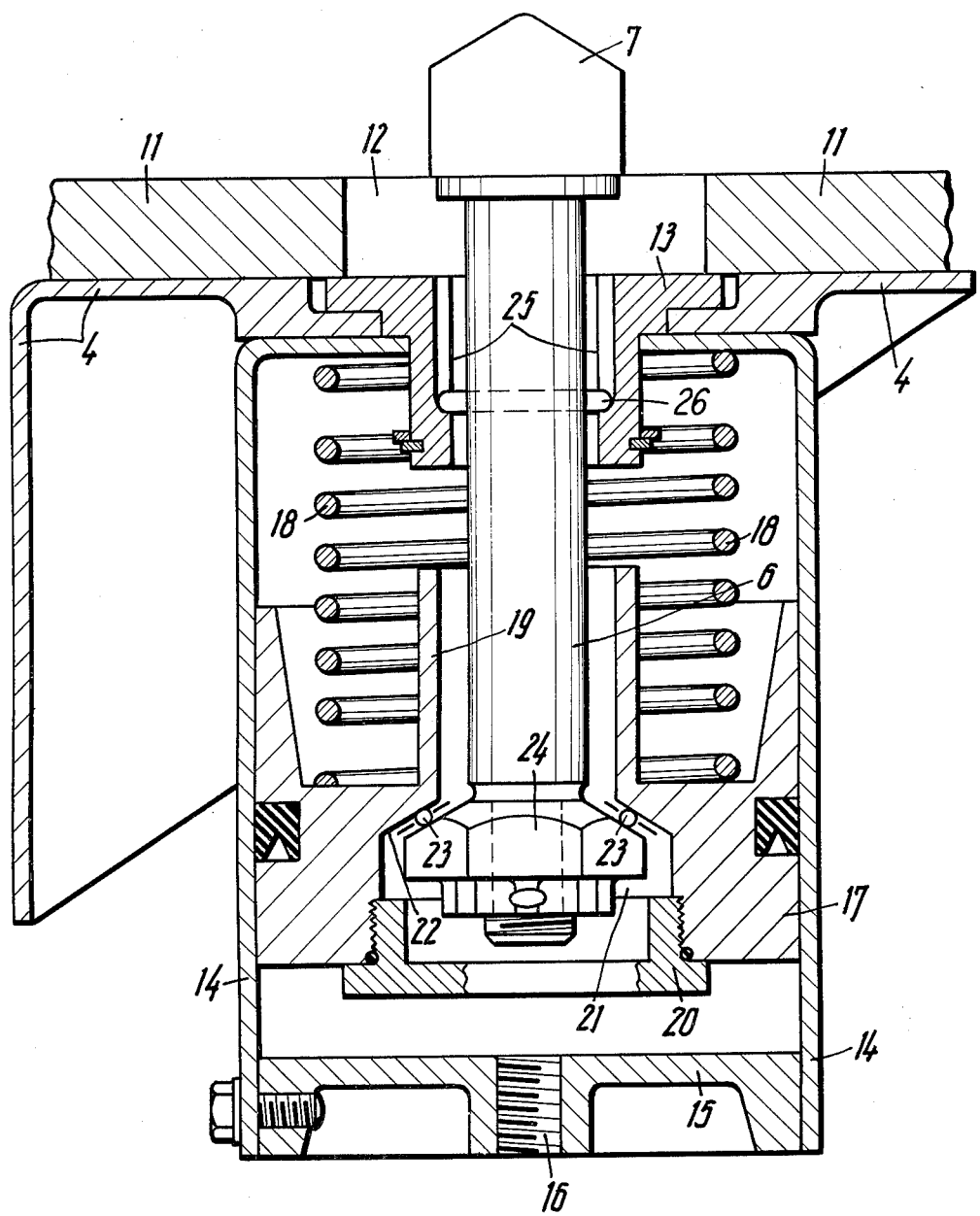
FIG. 5b is a similar view as in FIG. 5a, but with the operating cylinder in a tensioning position.

In FIGS 5a and 5b there is illustrated an embodiment of one of the locking devices of FIG. 1 in different operating positions. An insert 13 is contained in the bearing 4 in order to guide the tension rod 6 of the locking device. An operating cylinder 14 is attached to the bearing 4 from the bottom side, and a connector 16 for a conduit (not illustrated) for pressurized air is mounted in the bottom face 15 of the cylinder 14.

A plunger 17 is closely guided in the interior of the operating cylinder 14. On its upper side the plunger 17 is biased by a corresponding strong compression spring 18 while a pressurized fluid, for example, pressurized air, is applied to the lower side of the plunger from the connector 16. In the upward direction the lifting movement of the plunger 17 is limited by a stop 19 mounted on the plunger for engagement with the bearing insert 13.

In the interior of the plunger 17 there is provided a chamber 21 which can be closed by a cover 20 screwed into a threaded lower end of the chamber. This chamber has a cone-shaped bottom 22. The tension rod 6 is supported on this bottom via a ball bearing 23 by means of an abutment 24 screwed onto a threaded lower end of the tension rod. The bearing insert 13 has internal oppositely facing curved grooves 25 in which the tension rod 6 is guided by means of lateral extensions 26, pins, wedges, balls or the like as shown in FIG. 6.

FIG. 5c shows the geometry of the grooves 25. Point A corresponds to the extended position of the tension rod shown in FIG. 5a, and point B corresponds to its tensioned position shown in FIG. 5b. The axial end sections a and c of each groove 25 are displaced relative to each other by about 90°, and the intermediate section b of each groove is screw-shaped. In its extended position shown in FIG. 5a tension rod 6 has its extensions 26 disposed in axial end sections a of the grooves 25. The longitudinal axis of the locking head 7 then corresponds to the longitudinal axis I—I of the slot 12 in the plate 11 of a corresponding fitting 10 as shown in FIG. 3. When all of the tension rods 6 of the carriage 1 and their locking heads 7 are in this position, the container 9 with its fittings 10 can easily be lifted from the tension rods or inserted onto the tension rods from above. Upon the tensioning of each tension rod 6, its extensions 26 pass through the screw-shaped intermediate sections b of the corresponding grooves 25, whereby each tension rod is turned by about 90°. The longitudinal axis of the locking head 7 of each tension rod 6 then corresponds to the transverse axis II—II of the slot 12 as shown in FIG. 4. When each tension rod 6 is further tensioned, it will again be displaced straight forward according to the axial end section c until its locking head 7 engages the plate 11 of the corresponding fitting 10 from above. At that point in time the position of the components shown in FIG. 5b is reached. Each tension rod 6 and its locking head 7 is fixed in this position by the force of the compression spring 18 which presses the plunger 17 in the operating cylinder 14 down as soon as the pressurized fluid is released from the operating cylinder 14. When the equipment is operating with pressurized air, this is achieved by simply exhausting the operating cylinder 14 via the air conduit which is provided at the connector 16. It is because of the force of the compression spring 18 that the positive coupling between the container 9 and the carriage 1 is obtained. The compression spring 18 has the advantage that it can follow all shocks during the transportation of the container 9 and that it can also compensate for the wear between the fittings 10 of the container and the tension rods 6 of the locking devices of the carriage 1.

Figure 7:
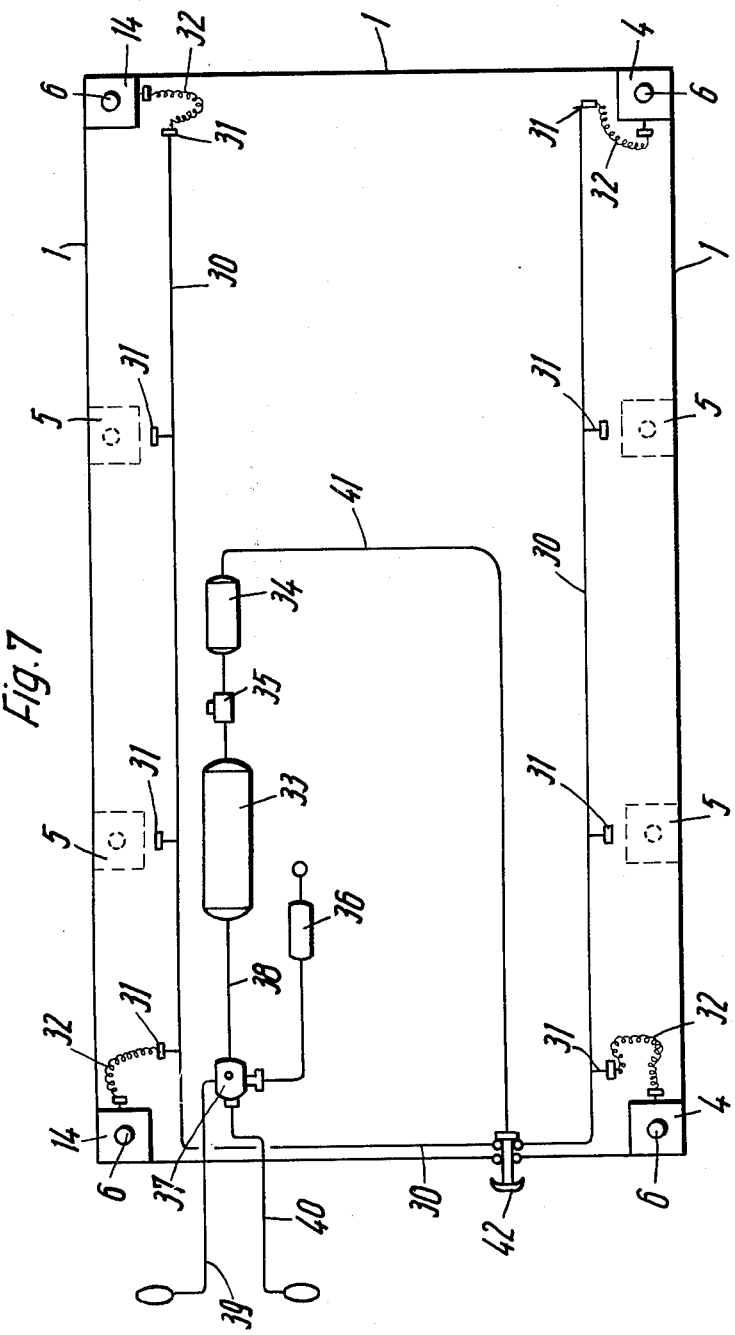
FIG. 7 is a schematic view of a fluid pressure system that can be used with locking devices of the type shown in FIGS. 5a–c.

FIG. 7 illustrates a fluid pressure system with pressurized air that is provided on a carriage 1 or a base member in order to simultaneously operate the different tension rods (such as those of the locking devices shown in FIGS. 5a and 5b) which are required for the fixation of a container. In each of the four bearings 4 there is provided a spring-loaded operating cylinder 14 for the respective tension rod 6. A common conduit 30 in the carriage 1 has connectors 31 adjacent to the various bearings 4 or 5 which connectors can be selectively connected to the operating cylinders 14 through hose pipes 32. Furthermore, the carriage contains a container 33 for pressurized air as well as an additional container 34 which are connected together by an overflow valve 35. The container 33 for pressurized air can simultaneously be used for supplying and operating braking cylinder 36 for the vehicle. It is supplied with pressurized air from a source, for example, from a compressor on the tractor, via a control valve 37 and conduits 38 or 39. Conduit 40 is a control conduit. The additional container 34 mainly serves to actuate the tension rods 6 and is connected to a control device 42 via a conduit 41. Control device 42 provides several switching positions. In one position the control device 42 allows the connected operating cylinders 14 of a tension rods 6 to be supplied with pressurized air in order to move all the tension rods into the release position. In another position the control device 42 allows the whole system to be exhausted so that the various operating cylinders 14 will release the compression springs 18 which will thereupon press the corresponding tension rods 6 into the tensioning and holding position.

The spring-loaded operating cylinder 14 and the tension rod 6 retained in the insert 13 of each bearing for a closed structure which can be connected to the pressurized air conduit 30. Thus, it is possible to move the locking devices together with their operating cylinder to the various terminals which are provided in the carriage 1 of the container for the fittings and to connect the operating cylinder to the respective connectors of the common conduit 30.

In FIG. 8 a further embodiment of a locking device is illustrated. A tension rod 6' with locking head 7' is located in a bearing 4 and is mounted in a bearing insert 13'. Conversely to the previously described embodiment, the insert 13' extends in the downward direction and forms a sleeve 45 with an internally slidable control cylinder 46. This control cylinder is placed on a square bar 47 provided at the end of the tension rod 6' and is provided with a radially extending pivot arm 48. The control cylinder 46 has a curved surface supported on a counter curve 49 in the interior of the bearing insert 13'. This counter curve 49 is screw shaped so that upon a rotation of the pivot arm 48 the tension rod 6' will be extended or withdrawn to the required extent.

FIG. 9 illustrates a fluid pressure system utilizing four locking devices of the type shown in FIG. 8. The two opposite tension rods 6' of the locking devices at each side of this system always have their pivot arms 48 connected to a common operating cylinder 50 which is floating (i.e., the operating cylinder 50 is connected to one of the pivot arms 48 via a connection rod 51, while the rod 53 of the plunger 52 is connected to the other pivot arm 48 via a connection rod 54). Similarly, to the previously described fluid pressure system, the operating cylinders 50 are connected to a common conduit 30 via hose pipes 32. A pressurized fluid (pressurized air) is applied to one side of each plunger 52, while the opposite side of each plunger is biased by a compression spring 18. Of course, the dual-groove guides 25 for 6' operate the connected tension rods in a counter sense. The operating cylinders 50 are connected such that the release of the tension rods 6' is actuated by the supply of pressurized air, while the tightening of the tension rods is effected by the compression springs 18. Also with this embodiment there are other possibilities such as exchanging the locking devices for a type that may be connected to the connectors in the supply system for the pressurized fluid.

Figure 10:
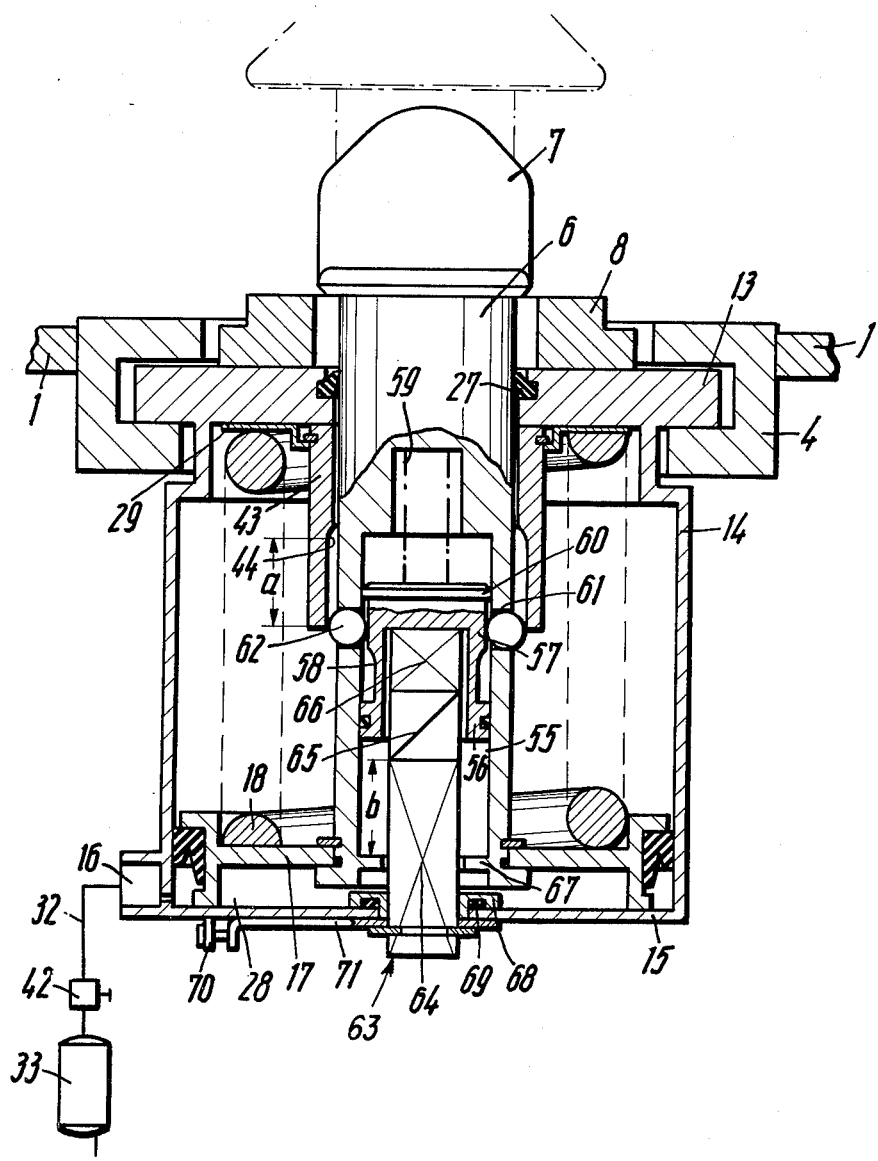
FIG. 10 is a cross-sectional view of still another embodiment of a locking device as inserted in a bearing of a base member, with no pressure applied.

In FIG. 10 there is illustrated a part of the carriage 1 which, for example, can take the form of a loading platform of a truck. At several locations of the carriage 1 there are provided bearings 4 into each of which a locking device for fixing a container is inserted. Each locking device comprises a bearing insert 13 which is suitably shaped with regard to the bearing 4. An operating cylinder 14 of the locking device is located on the bearing insert 13. This operating cylinder is closed at the bottom 15. A centering member 8 is mounted on the other side of the bearing insert 13. The bearing insert 13 and the centering member 8 have openings which are traversed by a tension rod 6. This tension rod 6 comprises a locking head 7 and a hollow shank. The tension rod 6 is inserted and sealed by a seal 27 in the opening of the bearing insert 13 and in the region of the shank. Seal 27 protects against dirt.

A plunger 17 is located at the rear end of the tension rod 6 and is sealingly guided in the operating cylinder 14. The tension rod 6 and the plunger 17 are connected with each other in the axial direction. However, they can be pivoted in a counterwise direction. The pressure seal for the plunger 17 is obtained by means of a packing. A pressure chamber 28 is provided on one side of the plunger 17 in the operating cylinder, and this chamber is connected to a hose pipe 32 via a connector 16. Pipe 32 is connected to a container 33 for a supply of pressurized air via a control device 42. The control device 42 has two positions which preferably can be selected by hand. In one position corresponding to the position of the plunger 17 shown in FIG. 10, the pressure chamber 28 is exhausted by means of the control device 42 while the hose pipe 32 connected to the container 33 for pressurized air is blocked. In the other position the pressurized air of the container 33 is supplied to the pressure chamber 28.

A compression spring 18 is provided at the rear side of the plunger 17 and is dimensioned according to the necessary biasing. The compression spring 18 is supported on the bearing insert 13 by means of a spring washer 29 which contains a spacing sleeve 43 as illustrated. The spacing sleeve 43 serves to limit the maximum movement of the plunger 17. Furthermore, the spacing sleeve 43 has an internal surface 44 consisting of two parts which have a different diameter and are connected to each other. One part of the surface 44 has the length $a$. The other part is connected to the opening in the bearing insert 13.

The tension rod 6 with the hollow shank forms a cylindric guide 55 in which the operating plunger 56 is housed. Operating plunger 56 has its own shank 57 with a superficies 58 the diameter of which varies in the longitudinal direction of the shank 57. The components can be shaped as illustrated in the drawing. Operating plunger 56 is supported on the tension rod 6 via a retracting spring 59. This spring is dimensioned to exert substantially less force than the compression spring 18. Operating plunger 56 has a peripheral rim 60 by which it is also guided in the cylindric guide 55. The operating plunger 56 is located in the cylindric guide 55 so that it has only a limited clearance.

In the illustrated position the shank of the tension rod 6 has perforations 61 in which notch balls 62 are located. The notch balls 62 together with the shank of the tension rod 6, the superficies 58 of the operating plunger 56, and the inner surface 44 of the spacing sleeve 43 form a ball notch having a function to be explained later.

According to FIG. 10 the operating plunger 56 is supported on a guiding rod 63 which penetrates the bottom 15 of the operating cylinder 14 as well as the plunger 17. The guiding rod 63 is a casting having a surface with undercuts. For example, it has a straight square member 64 to which are connected a screw-shaped square member 65 that is twisted by 90° as well as a straight square member 66. Of course, members with a hexagonal cross section or another profile could be selected instead of the square-shaped members. The tension rod 6 has a collar 67 which matches the profile of the guiding rod 63 and which in this embodiment has a square perforation. This insures that upon a movement of the tension rod 6 relative to the stationary guiding rod 63 the tension rod 6 will at first undergo a translatory movement for as long as the collar 67 is in the region of the straight square member 64. Then, as the collar 67 moves along the screw-shaped square member 65, the tension rod 63 will make a rotary movement during which the locking head 7 of the tension rod 6 is turned by 90°. Subsequently, the collar 67 will reach the region of the straight square member 66 whereby a translatory movement is again initiated. The last-mentioned translatory or lifting movement can be omitted according to the respective application. Square member 64 extends opposite to the collar 67 into the cylindric guide 55 over a length $b$. The length $b$ is always greater than the length $a$. For the purpose of fixation the container to be transported has fittings 10 (see FIG. 11) of a certain height.

The guiding rod 63 is pivotally mounted in the bottom 15 of the operating cylinder 14 by means of a sleeve 68 which has a packing 69. A lever 71 is engaged on the outside of the bottom 15 of the operating cylinder 14 and is connected to the guiding rod 63 so that it cannot be turned. A bearing 70 serves to fix the lever 71 in a certain angular position. The bearing 70 is made detachable. To make the non-rotatable connection with the guiding rod 63 the lever 71 may have a perforation which matches the profile of the guiding rod 63.

The operation of the locking device will now be explained with reference to FIGS. 10, 11 and 12. In the unpressurized condition the components of the locking device are positioned relative to one another as shown in FIG. 10. The locking device is inserted into the bearing 4 at the carriage 1 by means of the insert 13. In this position the locking head 7 is located on top of the centering member 8. The plunger 17 is coupled to the tension rod 6 or to its shank and is biased by the compression spring 18. The notch balls 62 are prevented from dropping through the perforations 61 by means of the spacing sleeve 43.

After the respective connections of the hose pipe 32 have been made, the control device 42, which suitably operates all parts on the carriage 1, is switched to the position for which pressurized air from the container 33 for the air supply will pass into the pressure chamber 28 and into the interior of the cylindric guide 55. Since the retracting spring 59 is substantially weaker than the compression spring 18, at first the operating plunger 56 will be lifted from the guiding rod 63 and its rim 60 will engage the shoulder of the cylindric guide 55 in a position relative to the tension rod 6 as shown in FIG. 11. The superficies 58 of the operating plunger 56 will be displaced relative to the notch balls 62 so that the section of the superficies with the smaller outer diameter will be adjacent to the notch balls 62. Upon a further increase of pressure in the pressure chamber 28, the plunger 17 will be displaced against the force of the compression spring 18, whereby the non-rotatable guiding rod 63 will cause a pure lifting of the tension rod 6 as long as the collar 67 slides along the straight square member 64. Then the locking head 7 of the tension rod 6 will be pivoted by 90° in order to cause a pivot lifting of the tension rod as the collar 67 slides along the screw-shaped square member 65. After passing the screw-shaped square member 65 there will again be a pure lifting of the tension rod 6 as the collar 67 slides along the straight square member 66. Then, the components of the locking device will have the relative positions shown in FIG. 11. During this movement of the tension rod 6 the notch balls 62 will be radially displaced inward by means of the internal surface 44 of the spacing sleeve 43. This is enabled as the rim 60 of the operating plunger 56 engages the shoulder of the cylindric guide 55 and as the superficies 58 of the operating plunger 56 is correspondingly shaped.

Figure 11:
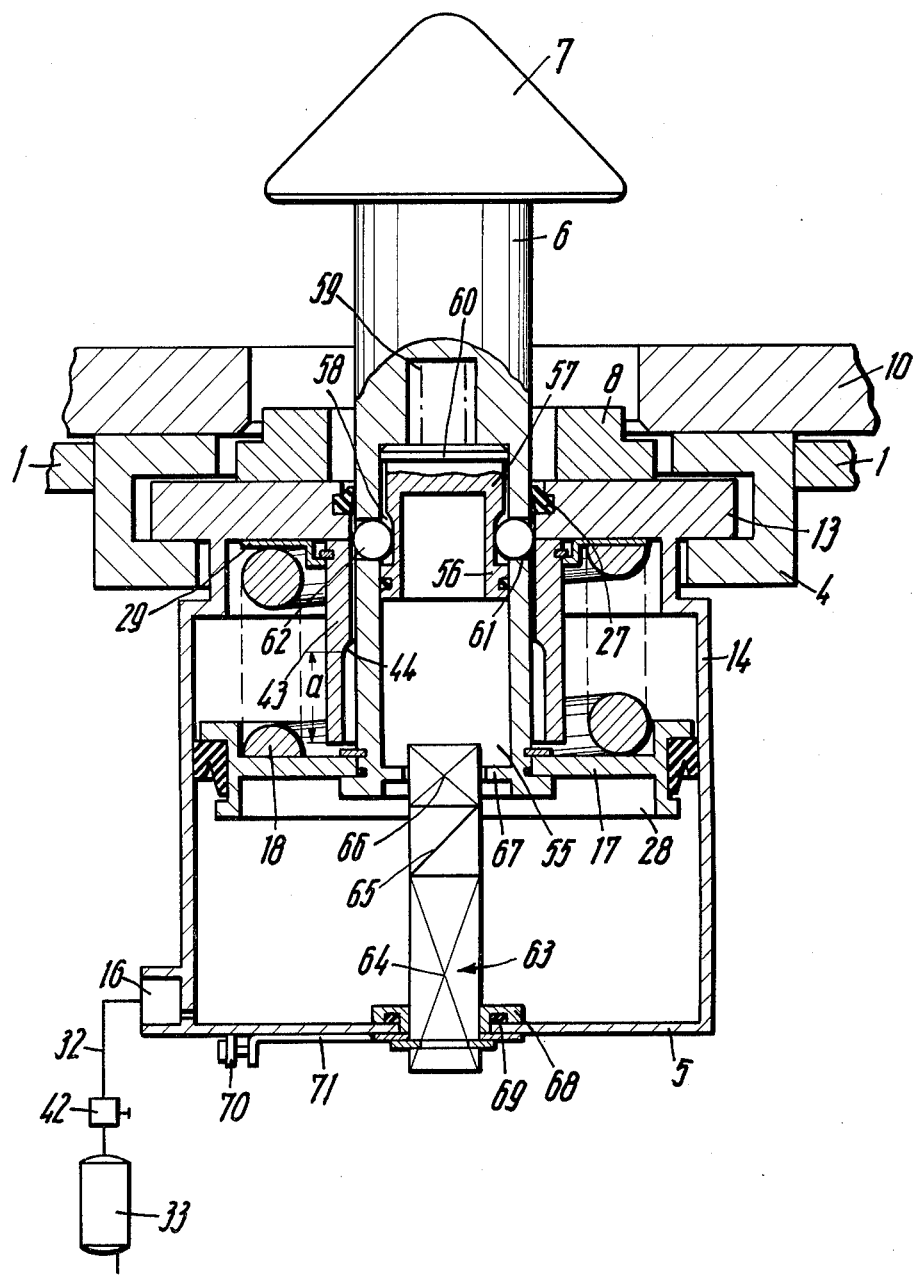
FIG. 11 is a view of the locking device of FIG. 10 in the release position and after putting a container on top of the base member.

When each locking device of the carriage 1 is in the position shown in FIG. 11, the container with its fittings 10 can be put on top of the carriage. The fittings 10 have oblong openings which accommodate the form of the locking head 7 of the tension rod 6 shown in FIG. 11. It is only when the locking head 7 of the tension rod 6 of each locking device of the carriage 1 is in the position shown in FIG. 11 that the fittings 10 or the container, can pass beyond the locking heads.

In order to lock the container in place on the carriage 1, each locking device on the carriage is operated in the following manner. The control device 42 is reset to the position for exhausting the pressure chamber 28 so that the pressure in the pressure chamber is lowered. This permits the compression spring 18 to displace the plunger 17. The tension rod 6 is entrained with the plunger 17 and is rotated relative to the plunger 17 so that the locking head 7 is moved into a position corresponding to that of FIG. 10 and is placed on top of the upper side of the corresponding fitting 10 of the container as shown in FIG. 12. Upon operation of each locking device on the carriage 1 in this manner, the fittings 10 and, hence, the container are positively connected and kept connected to the carriage by the force of the compression springs 18 of the locking devices of the carriage.

Figure 12:
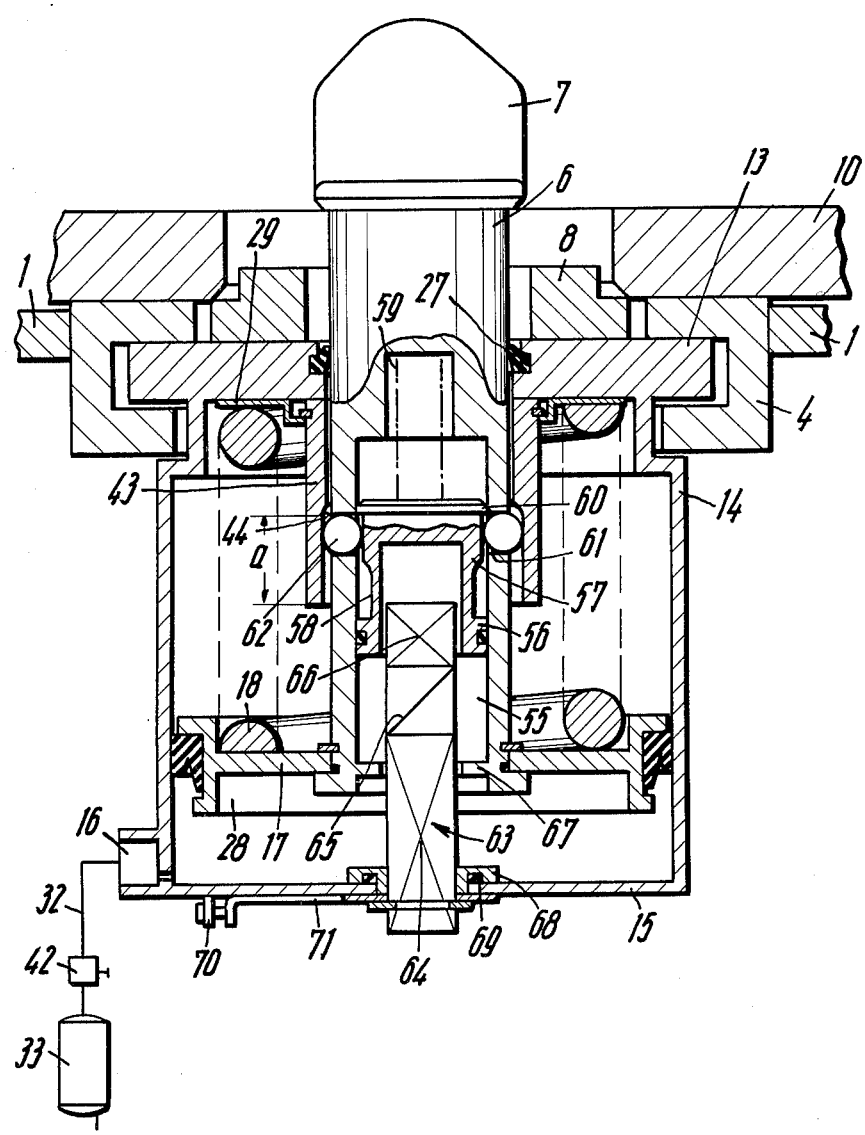
FIG. 12 is a view of the locking device of FIGS. 10 and 11 after the positive coupling between the container and the base member is secured.

During the downward movement of the locking head 7 or of the tension rod 6 of each locking device on the carriage 1 into the locking position shown in FIG. 12, the notch balls 62 again reach the part of the internal surface 44 of the spacing sleeve 43 which has the greater diameter. As now the inner volume of the cylindric guide 55 is no longer subjected to pressure, the retracting spring 59 will displace the operating plunger 56 until the rim 60 of the operating plunger 56 rests on top of the notch balls 62. The locking device components are arranged so that the notch balls 62 will now engage the section of the internal surface 44 of the spacing sleeve 43 that has the greater diameter and will simultaneously fix the operating plunger 56. Thus, the notch balls 62 can no longer pass into the section of the internal surface 44 of the spacing sleeve 43 that has the smaller diameter. However, the notch balls 62 are not located directly at the transition of the two sections of the inner surface 44 but are displaced downwards to a certain extent as shown in FIG. 12. The compression spring 18 and the locking head 7 therefore have a certain resilient path before the locking by form-coupling takes place. This locking by form-coupling limits the possible resilient path of the compression spring 18 in the position shown in FIG. 12. If, for example, the container together with the carriage 1 is loaded onto a different means of transportation, for example onto a railroad car, that means of transportation will be used to engage the container, and the locking by form-coupling will be used in order to lift the carriage 1 above the container. Thus, the locking by form-coupling is mainly a safety means against forces arising during transport which would overcome the force of the compression spring 18.

When the connection established by each locking device between the container and the carriage 1 is to be disconnected, the control device 42 will usually be switched and pressurized air will again be supplied to the pressure chamber 28 so that the locking device components take the relative positions shown in FIG. 11 thereby permitting the container to be lifted from the carriage 1. However, it is also possible to lift the container from the carriage 1 when no pressurized air is available or when the supply for pressurized air fails. This is true, for example, with a trailer that is to be unloaded after a long idle time. In this case it is merely necessary to detach the bearing 70 and to pivot the tension rod 6 by means of the lever 71 so that the guiding rod 63 is turned around. Then the locking head 7 will take a position, relative to the corresponding fitting 10, in which it can penetrate the opening of the fitting. The force of the compression spring 18 will press the locking head 7 onto the centering member 8. Now the container can be taken off the carriage 1. After the supply means for pressurized air is operated again or the trailer has been connected to a pulling car having such a supply means, the guiding rod 63 of the locking device will again be turned around into the normal position by pivoting the lever 71. The bearing 70 is fixed so that the guiding rod 63 is prevented from rotating.

We claim:

1. Apparatus for locking a container on a base member, said apparatus including one or more spring-loaded tension rods mounted at the base member to engage by force and form one or more fittings provided at the container, where each tension rod has a locking head and can be moved from a locking position into a release position by means of a guide, wherein the improvement comprises a drive means for lifting and pivoting each tension rod into the release position, said drive means comprising a fluid pressurized plunger guided in a working cylinder, the working cylinder being adapted for communication with a source of fluid pressure via a control device, and further comprises a compression spring for the automatic self-locking and continuous retensioning of each tension rod.

2. Apparatus as in claim 1 wherein each tension rod together with its plunger and its working cylinder form an upright unitary structure mounted at the carriage, the tension rod being pivotally mounted in that structure and being located in the plunger with axial clearance.

3. Apparatus as in claim 1 wherein each tension rod is partially hollow and its guide comprises a stationary guiding rod with guiding surfaces which allow at least a lifting movement and both a lifting and a pivoting movement of the tension rod relative to the guiding rod, wherein each tension rod comprises a collar matched to the guiding rod, and wherein the guiding rod is of a cross section such that the collar is constrained to follow the guiding rod.

4. Apparatus as in claim 1 wherein a locking structure is provided to limit the lifting and the pivoting of each tension rod in its unpressurized condition.

5. Apparatus as in claim 4 wherein the locking structure includes a fluid pressurized operating plunger.

6. Apparatus as in claim 5 wherein the locking structure includes notch balls.

7. Apparatus as in claim 6 wherein the shank of each tension rod forms a cylindric guide in which the operating plunger of the locking structure is closely guided, wherein pressurized fluid is applied to one side of that operating plunger while its other side is biased by a retracting spring supported in the tension rod, and wherein the cylindric guide comprises a cage for the notch balls.

8. Apparatus as in claim 7 wherein a spacing sleeve surrounds each tension rod and is provided in a region of translatory movement of the notch balls in order to control radial movement of the notch balls.

9. Apparatus as in claim 8 wherein the operating plunger of the locking structure comprises a shank having a superficies, the diameter of which varies in the longitudinal direction of the shank.

10. Apparatus as in claim 9 wherein the spacing sleeve has an internal surface facing the notch balls and being of a diameter that varies in the longitudinal direction of the spacing sleeve.

11. Apparatus as in claim 5 wherein the operating plunger of the locking structure is located in a tension rod with limited displacement capability.

12. Apparatus as in claim 3 wherein the guiding rod sealingly penetrates the bottom of the working cylinder, is pivotally located therein, and can be arrested therein.

13. Apparatus as in claim 12 wherein at one end of the guiding rod which penetrates the bottom of the working cylinder a radially extending lever is provided and is nonrotatably connected to the guiding rod, and wherein at the bottom of the working cylinder a detachable bearing is provided for fixing the lever.

14. Apparatus as in claim 1 wherein each tension rod is sealingly and rotatably located in its plunger.

15. Apparatus as in claim 1 wherein the working cylinder and the plunger are disposed in a horizontal arrangement with each tension rod coupled to its plunger via a pivot arm.

16. Apparatus as in claim 15 wherein the horizontally located working cylinder is floatingly located between opposing arms which can be turned in opposite directions.

* * * * *